Aug. 11, 1964    R. HÖHL    3,144,296
RECORDER
Filed April 4, 1962    2 Sheets-Sheet 1

Aug. 11, 1964  R. HÖHL  3,144,296
RECORDER

Filed April 4, 1962  2 Sheets-Sheet 2

United States Patent Office 3,144,296
Patented Aug. 11, 1964

3,144,296
RECORDER
Rudolf Höhl, Frankfurt am Main, Germany, assignor to Hartmann & Braun Aktiengesellschaft, Frankfurt am Main, Germany, a corporation of Germany
Filed Apr. 4, 1962, Ser. No. 184,985
Claims priority, application Germany Apr. 19, 1961
13 Claims. (Cl. 346—141)

The invention is based on a recorder for intermittent recording of measuring values, especially a multiple dotted line recorder where the element bringing about the marking of the chart is arranged with articulation. The element printing on the chart is actuated by a spring engaging outside the bearing and the extremity of which is moved periodically across the connecting line between the articulating bearing and the point of force of the spring.

The invention is applicable for both chopper bar recorders and printing systems of potentiometer recorders.

Figure 1A:
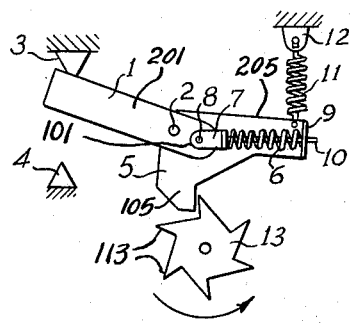
Figure 1B:
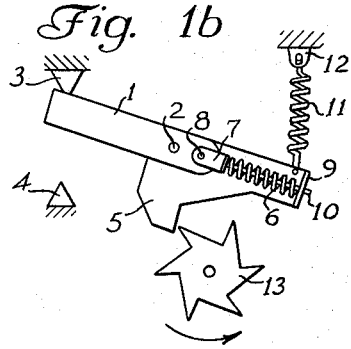
Figure 1C:
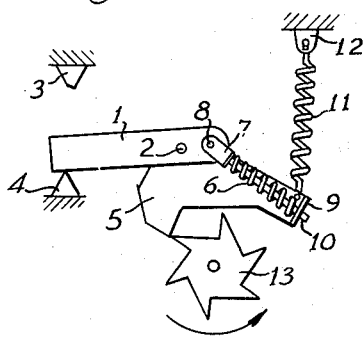

FIGS. 1a, 1b, 1c show a form of the invention in successive operational steps.

Figure 2A:
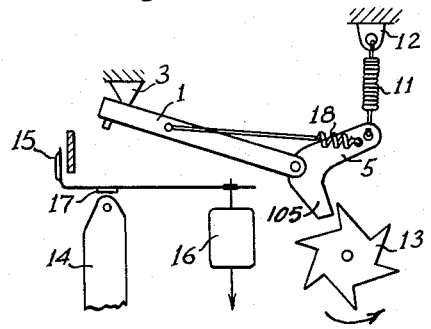
Figure 2B:
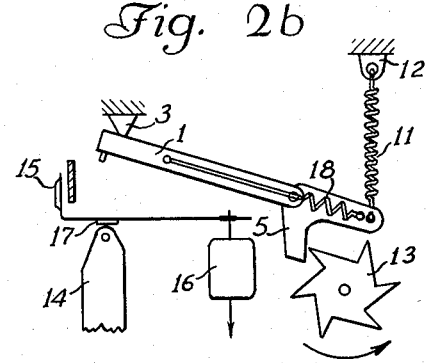
Figure 2C:
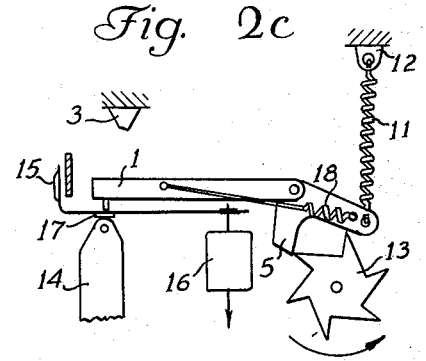

FIGS. 2a, 2b, and 2c show similarly another form of the invention.

Bar 1 serves either itself for marking by the printing device or it may have the function of supporting a type wheel for printing. Bar 1 is disposed for turning about a fixed point as on a shaft 2 and can be deflected between a stop 3 and a chart carrier or support 4.

An L-shaped pawl or carrier member 5 having a toothed portion or leg 105 and a mounting portion or leg 205 is mounted at the corner portion thereof on the shaft 2 also for pivotal turning on the shaft. Bar 1 has a longer arm 201 and a shorter arm 101, the latter carrying a guiding hinge member 7 pivoted, as at 8, on the shorter arm, the member 7 being provided with a guide rod 10 passing slidably through an apertured flange ear 9 on the leg 205. A pressure spring 6 about the guide rod is compressed between the hinge member 7 and the ear 9. By this construction the short arm 101 and the rod 10 form a sort of floating toggle joint mounted on the carrier member 5. A tension spring 11 attached between a fixed member 12 and the outer end of the leg 205 tends to turn the pawl member and toggle joint in an anti-clockwise direction. A pawl wheel 13 for engaging the leg 105 tends to turn the pawl member clockwise, against the tension of the spring 11 as the cogs 113 engage the leg 105 when the cog wheel turns anti-clockwise.

FIG. 1a shows the bar 1 in its upper rest position with the pressure or compression spring 6 acting in a direction to cross the shaft 2 below same and urging the arm 101 against the stop 3.

As can be seen from an inspection of FIGS. 1a, 1b and 1c, the spring 11 as in FIG. 1a is under no tension save that to reduce the effective weight of the leg 205 after allowance for the moment due to spring 6.

Anti-clockwise turning of the cog wheel causes the leg 105 to move to the left and the leg 205 to move downwardly.

FIG. 1b shows the position of the pawl in the very moment when the direction of force of pressure spring 6 is radial to bearing shaft 2. Upon movement of the right end of pawl 5 further downward, the direction of force of pressure spring 6 passes above bearing shaft 2, so that the left end of bar 1 disengages from stop 3 and is moved downward by pressure spring 6 until it is stopped by support 4 of the recording chart. Pawl wheel 13 is adjusted accordingly so as to release the leg 105 of carrier 5 immediately after bar 1 has touched the chart support or bar 4.

When the leg or tooth 105 becomes free from the pawl wheel 13 so that the whole pawl or carrier 5 can turn about the shaft 2, the spring 11 pulls upwardly on the leg 205. But the bar 1 is disposed on the chart support 4 so that the spring 11, in pulling on the leg 205, turns the pawl member 5 about the shaft 2 and compresses the pressure spring 6 until the floating toggle joint passes dead center. Upon passage of dead center, the bar 1 is flung upwardly against the stop 3 to the position shown in FIG. 1a.

Further movement of the pawl wheel brings the whole system to the state shown in FIG. 1a.

FIG. 2 shows a recording device in another form according to the invention and based on the principle of a chopper bar recorder. It shows again a procedure of recording in three phases 2a, 2b, and 2c. The device shown in FIG. 2 contains again element 1 designed as a chopper bar, which on descent presses pointer 15 of measuring system 16 on chart 14. Colour ribbon 17 soaked with special ink is arranged between the pointer and the printing device. FIG. 2 in the same way as FIG. 1 shows a pawl being under the influence of a tension spring and a pawl wheel. This modification is generally similar to the form previously described except that the toggle is under bias of a tension spring 18 rather than a compression spring and consequently the short arm 101 may be omitted. The spring 18 is stretched between the leg 205 and long arm 201. FIG. 2b shows how the pawl is moved downward by the turning pawl wheel 13, thus putting spring 18 under stress until—as shown in FIG. 2c—bar 1 is flung down. Immediately hereafter the cog of wheel 13 releases pawl 5 which will be pulled upward by spring 11. This causes bar 1 to be pulled back into the position shown in FIG. 2a.

Figure 3:
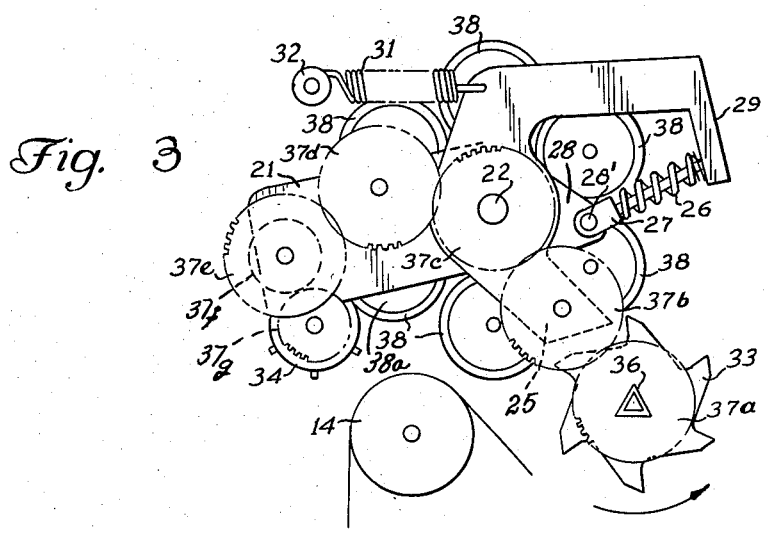

The multiple printing device of FIG. 3 also comprises a swingable bar 21 very similar to bar 1 in FIG. 1a and mounted to turn about a shaft 22 corresponding to shaft 2. Pawl or carrier member 25 corresponds to the member 5 of FIG. 1 and turns on the shaft 22, the hook flange 29 corresponding in function to the apertured ear 9. Pressure spring 26 is compressed between the flange 29 and a hinge member 27 pivoted at 28' on the short end 28 of the bar 21 tending to turn the end 29 downwardly and keep the left end elevated against a bar stop not shown in the drawing. If the cog of pawl 25 is moved to the left by pawl wheel 33 the hook 29, being integral with the cog, will be shifted downward until the direction of force of spring 26 passes above the common shaft 22.

Then spring 26 causes the left end of bar 21 to move downward, whereupon one of the types of wheel 34, rotatably mounted on said left end, hits chart 4. In the following moment the cog of pawl 25 leaves the cog of pawl wheel 33 and arm 29 is moved upward by tension spring 31 fastened at point 32. Now pawl 25 and bar 21 actuated by spring 26 resume the shown position. Pawl wheel 33 has a triangular groove 35 through which guide rod 36 with triangular cross section passes. Rod 36 together with an additional slide bar not shown in the drawing serves as guide of the shown printing device which, depending on the value measured, is moved along the chart by a servomotor. Continuous rotation of guide rod 36 transfers a rotary motion to pawl wheel 33 which across cog-wheels 37a, 37b, 37c, 37d, 37e, 37f, 37g also turns the printing cylinder 34. The same movement also causes rotation of felt rolls 38, thus one of felt rolls 38 wets respectively with coloured ink one of the printing types of wheel 38.

Figure 4:
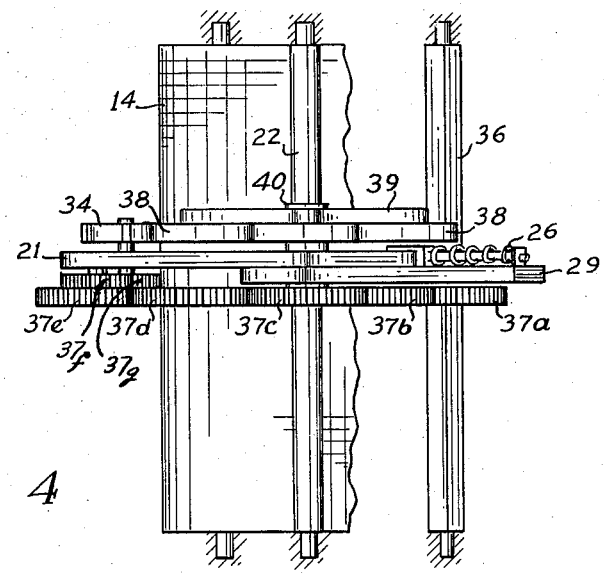

In the operation of the invention shown in FIGS. 3 and 4 the servo motor (not shown) slides the instrument laterally across the chart to register, say, pressure values according to the instrument's position along the shaft 22. To register say temperature, the same operation is used. To distinguish pressure and temperature marking, different color ink rolls 38 can be turned to the position occupied by roll 38a in FIG. 3 which is in inking position for the printing wheel 34. Since the printing wheel gyrates on the bar 21 about the shaft 22 different color wheels 38 of equal diameter may be mounted on a spider 39 for revolving about the shaft at 40 to make all the color wheels movable to positions tangential to the printing wheel.

Since the instrument is to be slidable across the chart, obviously the mount 32 for the spring 31 must also be slidable, as on a fixed bar (not shown) parallel with the shaft 22.

As shown in FIG. 3, with the gear train 37a through 37g having one-to-one ratio and the pawl wheel 33 and printing wheel each having six-step positions, a successive different type strikes the chart with each trip of the bar 21. By having six different inking wheels, blending of inkings on the printer can be avoided.

I claim:

1. A recording instrument comprising a substantially definitely located shaft; a two-armed member having a long marker arm and a short arm and mounted for pivotal movement on the shaft; a chart bearer in the path of pivotal movement of the long arm toward which the arm moves— for making a mark; a pawl member pivotally mounted on the shaft and having a tooth portion and a mounting portion, the mounting portion being adjacent the short arm and remote from the shaft; first resilient bias means between and on the mounting portion and one of said arms for tending to prevent alinement of given points on the mounting portion and two-armed member respectively in an axial plane of the shaft, yet permitting the alinement in a dead center state when the long arm is remote from the chart bearer, second bias means tending to turn the pawl member in the same angular direction as that to cause the marker arm to swing toward the chart bearer; stop means for limiting movement of the marker arm away from the chart bearer but at least sufficiently remote from the bearer to permit said dead center state; and a pawl wheel for engaging the tooth portion to turn the pawl member against the action of the last mentioned bias means and move the two-armed and pawl members through said dead center state while the long arm is against the stop for causing the long arm to swing from the stop to the chart bearer under the influence of said first resilient bias means.

2. An instrument as claimed in claim 1, said first bias means being a tension spring having one end attached to the long arm.

3. An instrument as claimed in claim 1 and a rotary printing wheel having type members equally spaced about the periphery thereof and carried on the marker arm, a gear wheel coaxial with the arm and rotatable therewith, and gear train means for transmitting motion of the cam to the printing wheel.

4. In an instrument as claimed in claim 3, the number of said type members being equal to the number of high points on the cam, and the same number of colored inking rolls turnably mounted to engage the type members.

5. An instrument as claimed in claim 1, said first resilient bias means being on the short arm and including a spring under compression between the short arm and the mounting portion.

6. An instrument as claimed in claim 5 said spring being a helical spring and having a guiding rod therein slidable through at least a part of the mounting portion.

7. In a recording instrument, two toggle-like members, one a marker arm, disposed together for toggle action passing through a dead center state; a shaft carrying the arm for pivotal movement of the arm about the axis of the shaft; bias means for tending to prevent dead center state of the members; a fixed chart bearer in the path of said pivotal movement for the marker arm to cooperate with and on one side of dead center, and a stop to limit turning of the arm away from the bearer and on the other side of dead center; a ratchet wheel-like cam mounted for rotation; engagement means turnable about the shaft and engageable with said cam for changing the angular position about the shaft of the outer end of the other toggle-like member with respect to the stop to cause the members to pass through the dead center state, when the arm is against the stop, for the bias means to swing the arm toward the chart bearer.

8. In an instrument as claimed in claim 7 said engagement means being fixed with respect to the other arm and the bias means being a tension member stretched between the toggle-like members.

9. In an instrument as claimed in claim 7, said engagement means being movable with respect to the other toggle-like member.

10. In an instrument as claimed in claim 7, said shaft connecting the toggle-like members substantially end-to-end for pivotal movement with respect to each other.

11. In an instrument as claimed in claim 7 said toggle-like members being pivotally connected together at a point remote from the shaft.

12. A recording device comprising a shaft in fixed location; a stop; a chart bearer; a two arm marker bar having long and short arms and mounted on the shaft for the longer arm to swing about the shaft axis substantially between the bearer and stop; a carrier mounted turnably with respect to the bar on the shaft and having an angularly turned apertured end portion remote from the shaft and generally facing same; a toggle member having means for pivotally connecting same to the shorter arm, the toggle member slidably passing through the apertured end portion; a compression spring on the toggle member between the end portion and said means for tending to keep the short arm and toggle member from a dead center state from each side of dead center so that passage away from dead center, with the carrier in given position, tends to swing the long arm toward or away from the bearer depending on the direction of passage from dead center; bias means tending to turn the carrier about the shaft axis in the same angular direction as that for swinging the long arm toward the chart bearer; said carrier having a substantially radial projection from the shaft, and rotary cog means for engaging on the projection to turn the carrier against the bias means while the long arm is against the stop and on one side of dead center, so that short arm and toggle member may be forced through dead center and the long arm swung toward the chart bearer by action of the compression spring.

13. A recording instrument comprising two substantially elongated members pivoted to turn about a common fixed point and disposable with given respective points therein substantially in a straight line containing the fixed point and on opposite sides of said fixed point; spring bias means for tending to close the members together equally well about the point in opposite senses and becoming inoperative when said respective points lie in said line; one of said members being an impact bar for marking a chart, and a chart support in the path of pivotal movement of the bar in one direction and a stop for limiting the movement in the opposite direction, and means for turning said other member to turn its given point out of said straight line and about the fixed point when the marker arm is against the stop and determines the location of the line.

References Cited in the file of this patent
UNITED STATES PATENTS
1,129,114    Norwood _____ Feb. 23, 1915
FOREIGN PATENTS
1,027,891    Germany _____ Apr. 10, 1958